United States Patent
Dickey et al.

(10) Patent No.: US 7,702,651 B1
(45) Date of Patent: Apr. 20, 2010

(54) SPATIALLY DEFINED UNIVERSAL DATES

(75) Inventors: Matthew Dickey, San Diego, CA (US); Brian J. Hamilton, Winchester, CA (US); Diane M. Wewerka, Poway, CA (US)

(73) Assignee: Teradata US, Inc., Miamisburg, OH (US)

( * ) Notice: Subject to any disclaimer, the term of this patent is extended or adjusted under 35 U.S.C. 154(b) by 699 days.

(21) Appl. No.: 10/347,045

(22) Filed: Jan. 17, 2003

Related U.S. Application Data

(60) Provisional application No. 60/437,330, filed on Dec. 31, 2002.

(51) Int. Cl.
*G06F 17/00* (2006.01)

(52) U.S. Cl. .................. 707/104.1; 707/200; 368/28
(58) Field of Classification Search .............. 707/1, 707/6, 101, 102, 200, 100, 104.1; 235/379; 368/17, 21, 28, 29, 47; 705/26; 709/219; 40/109; 455/456.5, 566; 715/517, 866
See application file for complete search history.

(56) References Cited

U.S. PATENT DOCUMENTS

| | | | | |
|---|---|---|---|---|
| 4,055,749 | A * | 10/1977 | Kraushaar | 377/52 |
| 4,479,722 | A * | 10/1984 | Salah | 368/17 |
| 5,793,716 | A * | 8/1998 | Lips | 368/28 |
| 5,926,814 | A * | 7/1999 | Fridman | 707/6 |
| 5,982,710 | A * | 11/1999 | Rawat et al. | 368/21 |
| 6,108,640 | A * | 8/2000 | Slotznick | 705/26 |
| 6,334,030 | B1 * | 12/2001 | Mizumo et al. | 396/310 |
| 2002/0069312 | A1 * | 6/2002 | Jones | 711/100 |
| 2002/0198898 | A1 * | 12/2002 | Werner | 707/200 |

FOREIGN PATENT DOCUMENTS

GB 2219108 A * 11/1989

OTHER PUBLICATIONS

Capers Jones, Fifty Years of Dangerous Dates, Feb. 9, 1999, Version 5, pp. 1-27.*

* cited by examiner

*Primary Examiner*—Fred I Ehichioya
(74) *Attorney, Agent, or Firm*—Frommer, Lawrence & Haug LLP

(57) ABSTRACT

Methods and apparatus for converting a date using spatial information. In one implementation, a method of converting date information using spatial information includes: storing date information in a storage format; receiving target spatial information; retrieving a target format indicator matching the received target spatial information, where the retrieved target format indicator indicates a target format based on a target calendar system; and converting the date information from the storage format to the target format.

39 Claims, 10 Drawing Sheets

| LOCATION | START | END | CALENDAR |
|---|---|---|---|
| <San Francisco polygon> | 01/01/1800 | --- | Gregorian |
| <La Jolla polygon> | 01/01/1800 | --- | Gregorian |
| <NCR, Rancho Bernardo polygon> | 01/01/1800 | --- | Gregorian |
| <X polygon> | 01/01/1700 | 01/01/1800 | Julian |
| <Y polygon> | 07/16/0622 | --- | Islamic |

205 — LOCATION, 210 — START, 215 — END, 220 — CALENDAR

| PLACE | LOCATION |
|---|---|
| San Francisco | 37°46'30"N, 122°25'06"W |
| La Jolla | 32°48'28"N, 117°10'28"W |
| NCR, Rancho Bernardo | 33°01'17"N, 117°05'36"W |

| CALENDAR | DATE | HOLIDAY |
|---|---|---|
| Gregorian | 12/25 | Christmas Day |
| Gregorian | 01/01 | New Year's Day |
| Islamic | 01/01 | Hijra New Year |

SPATIALLY DEFINED UNIVERSAL DATES

This application claims the benefit of U.S. Provisional Patent Application No. 60/437,330, filed Dec. 31, 2002, the disclosure of which is incorporated herein by reference.

BACKGROUND

Various countries use different calendar systems. For example, although the Gregorian calendar, used primarily by Western countries, is generally accepted worldwide as a standard, its acceptance is sometimes reluctant. Many people would prefer dates to be presented in a more culturally sensitive form that is appropriate to a particular geographical location, such as where they live. Furthermore, even when different countries use the same calendar system today, a different calendar system may have been in use at some time in the past (e.g., when a country switched from the Julian calendar to the Gregorian calendar) or people in the same country may use different calendar systems for different purposes (e.g., for cultural events).

Tables in databases are often used to store date information. However, it may be desirable to access date information in a table using multiple formats (e.g., outputting date information in multiple formats), such as when a database is used internationally. Similarly, it may be desirable to perform operations on date information using multiple formats (e.g., comparing date information input by a user with date information stored in the table).

SUMMARY

The present disclosure provides methods and apparatus for converting a date using spatial information. In one implementation, a method of converting date information using spatial information includes: storing date information in a storage format; receiving target spatial information; retrieving a target format indicator matching the received target spatial information, where the retrieved target format indicator indicates a target format based on a target calendar system; and converting the date information from the storage format to the target format.

In another implementation, a method of converting date information using spatial information includes: receiving date information in a source format based on a source calendar system; receiving source spatial information; retrieving a source format indicator matching the received source spatial information, where the retrieved source format indicator indicates a source format based on a source calendar system; and converting the date information from the source format to the storage format.

In another implementation, a database system includes: one or more data storage facilities for use in storing data composing records in tables of a database, including one or more fields storing dates in a storage format and an atlas table storing one or more calendar indicators; one or more processing modules configured to manage the data stored in the data-storage facilities; and a database management component configured to retrieve calendar indicators from the atlas table using spatial information and to use the retrieved calendar indicators to convert a date from the storage format to a target format matching a retrieved calendar indicator or convert a date to the storage format from a source format matching a retrieved calendar indicator.

BRIEF DESCRIPTION OF THE DRAWINGS

FIG. 2 is a representation of an atlas database table in a DBMS.

FIG. 3 is a representation of a gazetteer database table in a DBMS.

FIG. 10 is a representation of a holiday table in a DBMS.

DETAILED DESCRIPTION

Figure 1:
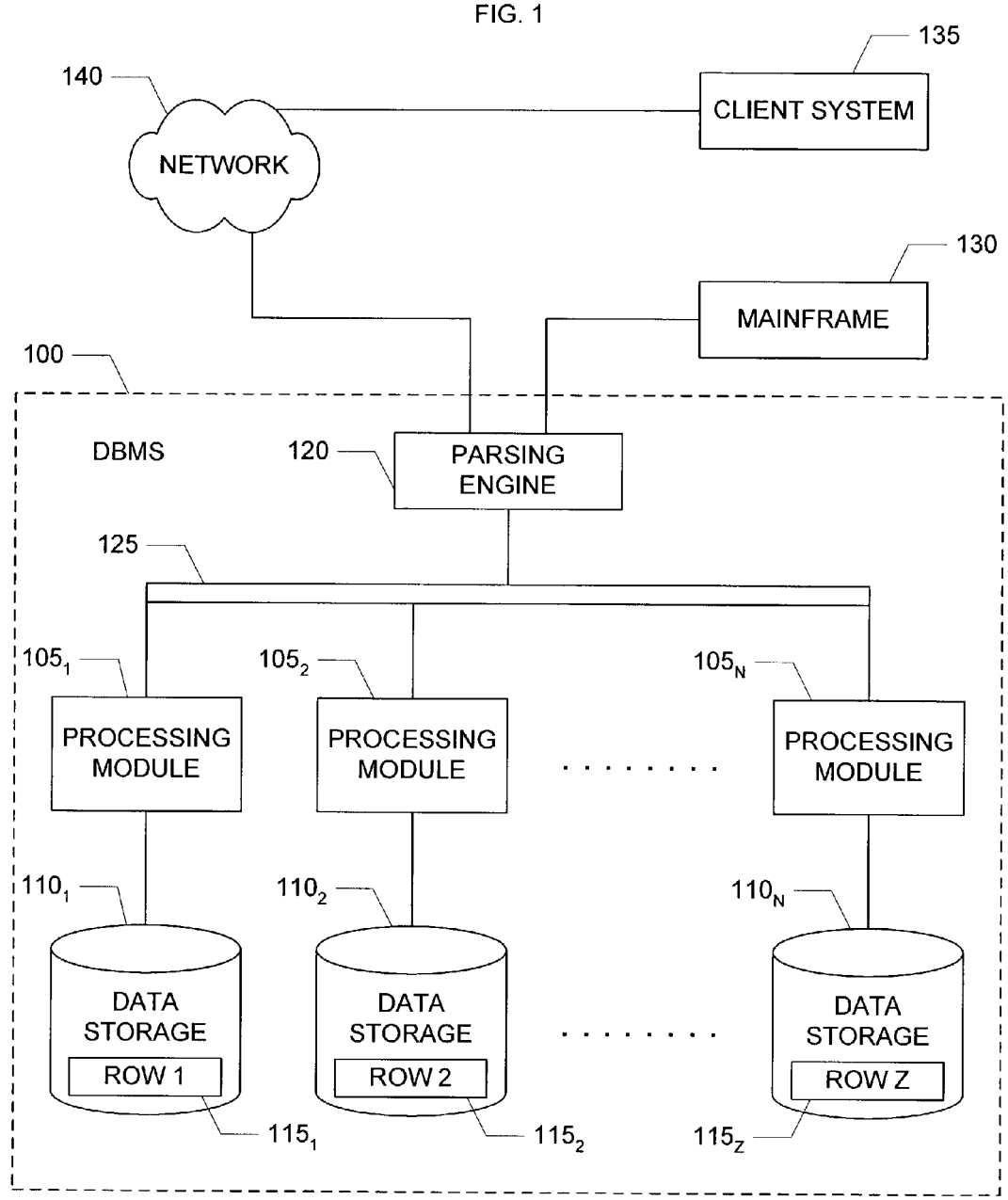
FIG. 1 shows a sample architecture of a database management system (DBMS).

FIG. 1 shows a sample architecture of a database management system (DBMS) 100. In one implementation, DBMS 100 is a parallel architecture, such as a massively parallel processing (MPP) architecture. DBMS 100 includes one or more processing modules $105_{1...N}$ that manage the storage and retrieval of data in corresponding data-storage facilities $110_{1...N}$. Each of processing modules $105_{1...N}$ manages a portion of a database that is stored in a corresponding one of data storage facilities $110_{1...N}$. Each of data storage facilities $110_{1...N}$ includes one or more storage devices, such as disk drives.

As described below, DBMS 100 stores and retrieves data for records or rows in tables of the database stored in data storage facilities $110_{1...N}$. Rows $115_{1...Z}$ of tables are stored across multiple data storage facilities $110_{1...N}$ to ensure that system workload is distributed evenly across processing modules $105_{1...N}$. A parsing engine 120 organizes the storage of data and the distribution of rows $115_{1...Z}$ among processing modules $105_{1...N}$ and data storage facilities $110_{1...N}$. In one implementation, parsing engine 120 forms a database management component for DBMS 100. Parsing engine 120 also coordinates the accessing and retrieval of data from data storage facilities $110_{1...N}$ in response to queries received from a user at a connected mainframe 130 or from a client computer 135 across a network 140. DBMS 100 usually receives queries in a standard format, such as the Structured Query Language (SQL) put forth by the American Standards Institute (ANSI). In one implementation, DBMS 100 is a Teradata Active Data Warehousing System available from NCR Corporation.

SQL provides various defined types of data and methods for accessing and manipulating data. SQL also supports user defined types (UDT) and user defined methods (UDM). In one implementation, DBMS 100 supports SQL and includes support for UDT's and UDM's.

In one implementation, DBMS 100 supports an object-based date UDT that converts date information among two or more date formats using spatial information. Date information includes a date, such as specifying a day, a month and a year. The format of the date is controlled by the date format of the date. A date format and the meaning of the date is based on a calendar system, such as the Gregorian calendar or the Islamic calendar. For example, a date in the Gregorian calendar might be 1 Jan. 2000 (day-month-year), and a date in the Islamic calendar might be 01 Muharram 1421 (day-month-year). In these two calendar systems, a different set of months is used and the years are counted from different starting points (e.g., 1 A.H. in the Islamic calendar is 622 C.E. or A.D. in the Gregorian calendar). A calendar system corresponds to one or more geographic regions or locations of the world. A calendar system also corresponds to one or more time periods. For example, while the Gregorian calendar is used in the year 2000 A.D. in the city of London in the United Kingdom, the Julian calendar was used at the same location in 1700 A.D. Accordingly, a location and time period can be used to select a calendar system. As described below, DBMS 100 includes an atlas table having fields for locations, time periods, and calendar systems and a gazetteer table having fields for coordinates and place names. In an alternative implementation, DBMS 100 uses location without time information to indicate a calendar system, such as using the geographical regions and calendar systems of the present day. In alternative implementations, DBMS 100 supports more than one kind of date UDT.

DBMS 100 stores dates in a storage format. The storage format is a generic or universal format, and can be independent of a particular calendar system. Alternatively, the storage format is the same date format as is most commonly used with DBMS 100. DBMS 100 converts a date input in a source date format to the storage format and stores the date. Accordingly, DBMS 100 also receives spatial information and time information along with the date to select the date format of the input source date. To output a date, DBMS 100 converts the date from the storage format to a target date format and outputs the date. Accordingly, DBMS 100 also receives spatial information and time information for the date to be output to select the date format of the target date. To convert a date from a source date format to a target date format (other than the storage format), DBMS 100 converts the date from the source format to the storage format and then converts the date from the storage format to the target date format.

DBMS 100 performs operations on dates in the storage format. For example, to compare an input date with a stored date, DBMS 100 converts the input date to the storage format and retrieves the stored date, which is already in the storage format. DBMS 100 then compares the two dates in the storage format. In another example, to determine the interval between two input dates, each of which is in a different date format, DBMS 100 converts both dates to the storage format and determines the interval between the two dates in the storage format. If appropriate, DBMS 100 converts the result to a target date format for output (e.g., the date format of one of the input dates).

FIG. 2 is a representation of an atlas database table 200 in DBMS 100. Atlas table 200 has four fields (columns): a location field 205, a start field 210, an end field 215, and a calendar field 220. The values shown in atlas table 200 In FIG. 2 are provided as examples of data and may not accurately represent real world values. Location field 205 stores a geospatial location for each entry (row), such as a polygon defining a region, a set of coordinates for latitude and longitude (e.g., using degrees, minutes, and seconds: 330117N, 1170536W; or only using degrees: 330N, 117W), or a region code (e.g., Canada is represented by the integer 42). In one implementation, location field 205 stores a polygon object of a polygon UDT. A polygon object indicates an ordered set of points (e.g., coordinates) which defines a spatial boundary of a region. The region may be a single contiguous polygon or include multiple discrete polygons. To select an entry by location, DBMS 100 compares a provided location (e.g., a pair of coordinates) to polygons stored in location fields 205 to find one or more polygons including the provided location. In another implementation, location field 205 includes two fields: one for latitude and one for longitude. In yet another implementation, location field 205 includes four fields: two for a latitude range and two for a longitude range.

Start field 210 and end field 215 store start and end dates for a time period for each entry. In another implementation, a start field 210 and end field 215 are replaced by a date range field storing a date range object that indicates a date range. Calendar field 220 stores a calendar indicator for each entry. The calendar indicator for en entry indicates which calendar system applies to the location indicated by location field 205 during the time period between the dates indicated by start field 210 and end field 215.

Accordingly, DBMS 100 uses a location and time to retrieve a corresponding calendar indicator. In one implementation, DBMS 100 uses the entry storing a polygon including the provided location (e.g., selecting the polygon or polygons including a provided set of points or coordinates, or matching a provided polygon). In another implementation, DBMS 100 translates a provided location to one of a defined set of locations. For example, in one implementation, DBMS 100 defines a collection of representative sets of coordinates (or region codes) for ranges of coordinates and translates received coordinates to one of the representative sets before accessing atlas table 200. Each calendar system compatible with DBMS 100 has a date format and so the calendar indicator is a date format indicator. The calendar indicator is used by conversion methods to properly process and convert a date to and from the storage format. Alternatively, a conversion method uses the calendar indicator as a key for a date format table to access date format information.

FIG. 3 is a representation of a gazetteer database table 300 in DBMS 300. Gazetteer table 300 has two fields: a place field 305, and a location field 310. Place field 305 stores a place name for each entry, such as a string (e.g., "San Diego, Calif."). Location field 310 stores a geospatial location for each entry, to match location field 205 in atlas table 200. In one implementation, location field 310 stores one or more polygons indicating corresponding regions including the named place. In another implementation, location field stores representative coordinates for the named place. Referring to FIGS. 1-3, DBMS 100 uses a place name to retrieve a location from gazetteer table 300 and then can use the retrieved location with a time to retrieve a calendar indicator from atlas table 200.

Figure 4:
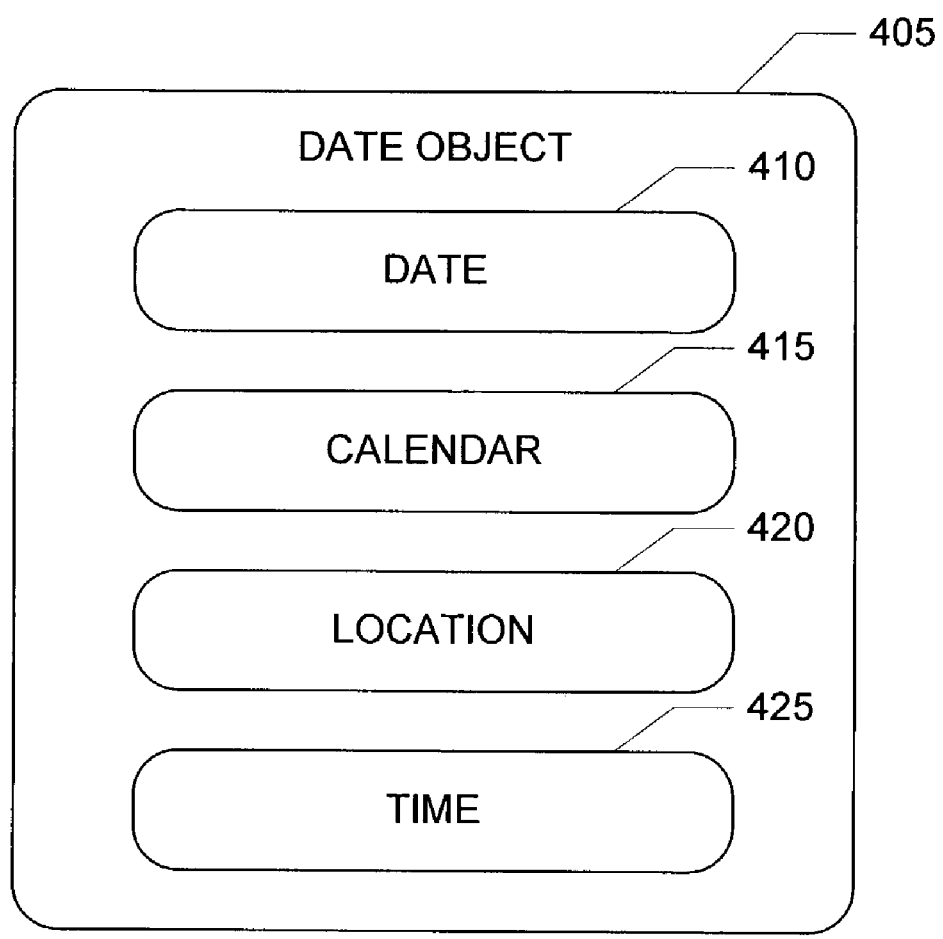
FIG. 4 is a representation of a date object.

The date UDT supports a date object to store and use dates. FIG. 4 is a representation of a date object 405. Date object 405 includes four data members: a date member 410, a calendar member 415, a location member 420, and a time member 425. Date member 410 stores a date. In one implementation, date member 410 includes three integer data members: day, month, and year. In another implementation, date member 410 stores a single integer (e.g., an eight digit integer such as 01012000 for 1 Jan. 2000) or a string (e.g., "1 Jan. 2000"). Calendar member 415 stores a calendar indicator as an integer. Location member 420 stores a location. In one implementation, location member stores a polygon object indicating a region. In another implementation, location member 420 stores a location as a pair of signed integer data members: latitude coordinate (e.g., yyyyyy to store latitude as a six digit integer with sign indicating north and south) and longitude coordinate (e.g., xxxxxxx to longitude as a seven digit integer with sign indicating east and west). In another implementation, location member 420 stores a string for a place name or an integer for a region code. Time member 425 stores a time as an integer, such as a year or a specific date. In another alternative implementation, DBMS 100 supports a pre-defined date type (i.e., similar to an integer or string, not a UDT) and date member 410 and time member 425 use that date type (in this case the value reflects the different date format). In an alternative implementation, DBMS 100 does not use time information to indicate a calendar system and so date object 405 does not include a time member.

DBMS 100 uses a date object to store a date and to pass dates for operations. In some cases, some data members may not yet store valid data. For example, when DBMS 100 receives a new date without a location, the location and time members may be blank. After establishing the correct location and time for the date, such as by using the date parser method described below, DBMS 100 fills in the data members. Similarly, the calendar member may be empty (or store undefined data) before DBMS 100 has retrieved a calendar indicator from the atlas table.

Figure 5:
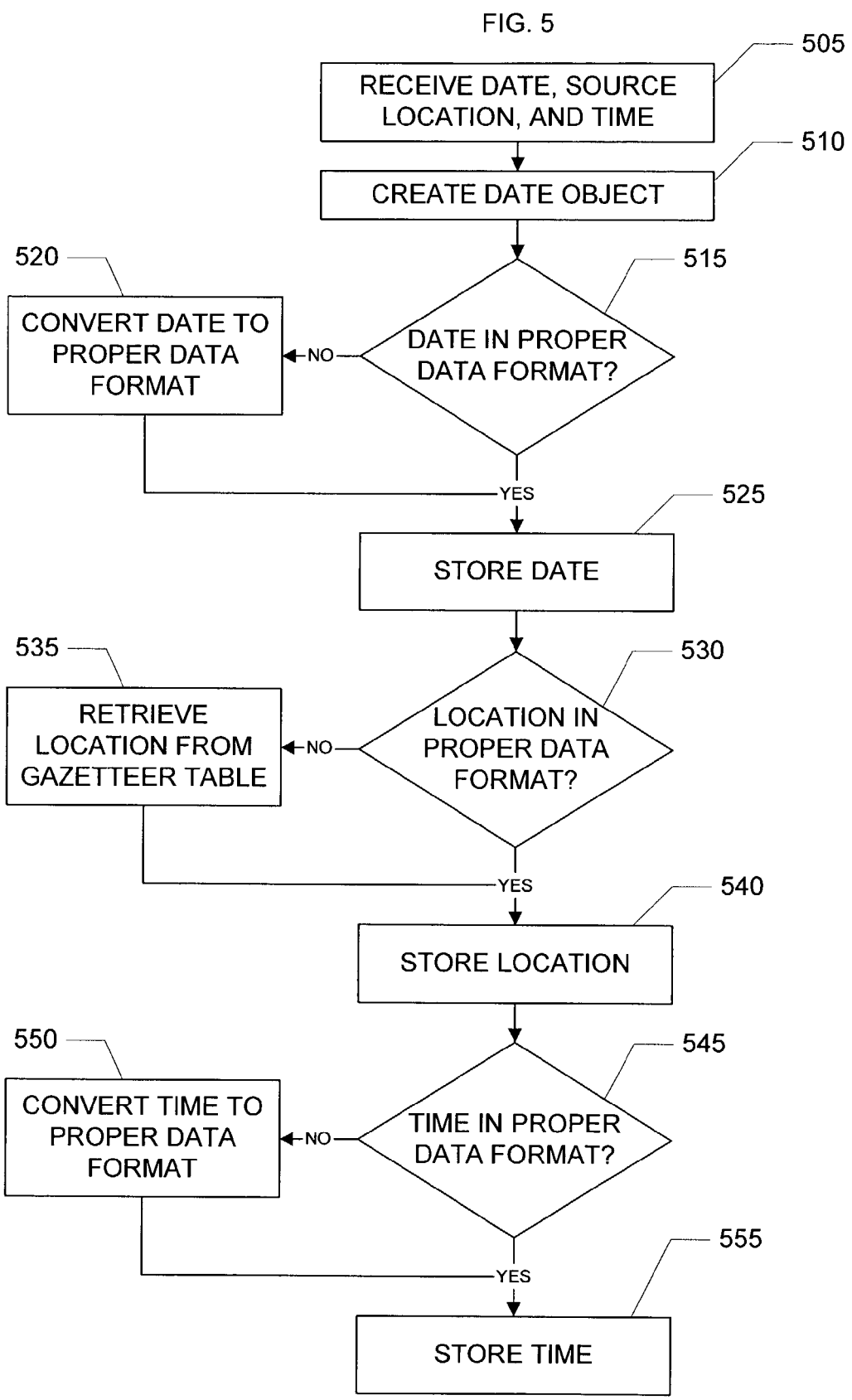
FIG. 5 is a flowchart of creating a new date object to store a new received date.

FIG. 5 is a flowchart of creating a new date object to store a new received date. DBMS 100 receives a date, source location, and source time, such as in input data from a user at client system 135, block 505. As discussed above, the date is a calendar date. The location and time indicate a geographic location and time period to indicate the calendar system of the date. If DBMS 100 does not receive a location or time, DBMS 100 uses default values, such as the current location and time where DBMS 100 is situated. In another implementation, if DBMS 100 does not receive a location or time, DBMS 100 sets the calendar indicator to a default calendar system (in this case, DBMS 100 does not retrieve a calendar indicator from the atlas table). In an alternative implementation, DBMS 100 queries the source of the input date (e.g., the user) for missing location and time information. DBMS 100 creates a new date object to store the received date, block 510. DBMS 100 uses a data constructor method, such as to create a date object 405 as described above referring to FIG. 4.

Before storing the received data in the new date object, DBMS 100 verifies the data format of the received data. DBMS 100 checks the received data to determine whether the date is in an appropriate data format, block 515. The proper data format for a date matches the data format of the date data member of the date object to store the date, such as an integer or series of integers, as described above referring to date member 410 of date object 405 in FIG. 4. When DBMS 100 receives a date in another data format, such as a string, DBMS 100 uses a conversion method to convert the date into a compatible data format, such as by using the date parser method described below, block 520. DBMS 100 stores the date in the proper data format in the date data member of the date object, block 525.

DBMS 100 checks the received data to determine whether the location is in an appropriate data format, block 530. The proper data format for a location matches the data format of the location data member of the date object to store the date, such as a polygon object or coordinates stored as integers, as described above referring to location member 420 of date object 405 in FIG. 4. When DBMS 100 receives a location as a place name, such as in a string, DBMS 100 uses the place name as a key to retrieve a location from the gazetteer table, such as gazetteer table 300 described above referring to FIG. 3, block 535. When DBMS 100 receives a location in another data format, DBMS 100 uses a conversion method to convert the location into a compatible data format, such as coordinates or a place name string (which is replaced in turn by a location retrieved from the gazetteer table). DBMS 100 stores the location in the proper data format in the location data member of the date object, block 540.

DBMS 100 checks the received data to determine whether the time is in an appropriate data format, block 545. The proper data format for a time matches the data format of the time data member of the date object to store the date, such as an integer, as described above referring to time member 425 of date object 405 in FIG. 4. When DBMS 100 receives a time in another data format, such as a string, DBMS 100 uses a conversion method to convert the time into a compatible data format, such as by using the date parser method described below, block 550. DBMS 100 stores the time in the proper data format in the time data member of the date object, block 555. In an alternative implementation, DBMS 100 prompts the user to re-enter any data (date, location, time) that is not in a proper format before creating a new date object.

Figure 6:
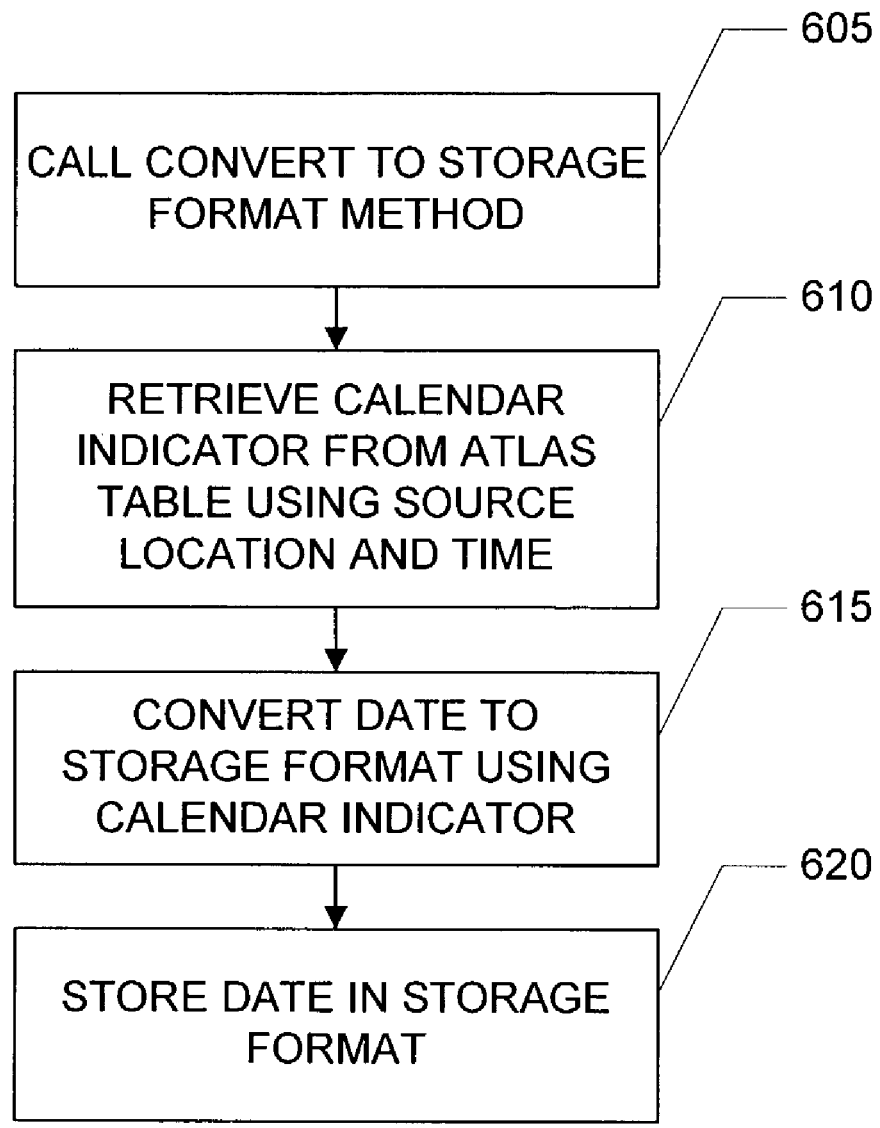
FIG. 6 is a flowchart of converting a date from a source format to the storage format.

FIG. 6 is a flowchart of converting a date from a source format to the storage format. After preparing a new source date object as described above referring to FIG. 5, DBMS 100 calls a conversion method for converting the date stored in the source date object to the storage format, block 605. DBMS 100 passes the source date object (or a reference to the object) as a parameter to the method call. DBMS 100 retrieves a calendar indicator from the atlas table using the location and time stored in the source date object, block 610. DBMS 100 uses the location and time as keys to select the entry matching the location and time (e.g., as selection criteria in a query to the atlas table). As discussed above, in one implementation, the atlas table stores polygon objects indicating regions and DBMS 100 selects one or more entries having polygons including coordinates provided as the location in the source data object. If the location and time match more than one entry having different calendar indicators, DBMS 100 selects one entry, such as by comparing the date stored in the source date object with the date formats indicated by the calendar indicators, matching default localization settings, or querying the user. DBMS 100 retrieves the calendar indicator stored in the selected entry, such as the data stored in the calendar field of an entry as described above referring to atlas table 200 in FIG. 2. DBMS 100 stores the retrieved calendar indicator in the calendar data member of the source date object. In one implementation, DBMS 100 retrieves more than one entry from the atlas table and selects one entry by comparing the date to the date formats indicated by the calendar indicators of the returned entries.

DBMS 100 uses the calendar indicator to convert the date from the source format to the storage format, block 615. The retrieved calendar indicator indicates the calendar system and date format of the date stored in the source date object. The conversion method selects a conversion process according to the calendar indicator. In one implementation, DBMS 100 calls another conversion method, specific to the format indicated by the calendar indicator (e.g., to convert from the Islamic calendar to the storage format). In one implementation, DBMS 100 creates a new date object and stores the converted date in the storage format in the new object. DBMS 100 also stores data in the new object indicating that the date is stored in the storage format, such as by storing a storage format indicator in the calendar data member of the storage object. In an alternative implementation, DBMS 100 stores the retrieved calendar indicator and source location and time information in the new object so that the stored object includes information indicating the date format in which the stored date was originally received. DBMS 100 stores the new storage object, block 620. In another implementation, DBMS 100 returns the storage object to the process or method that called the conversion method.

In one example, DBMS 100 uses a universal format as the storage format and a UDM (user defined method) called date_to_ut( ) as the conversion method for converting from a source format to the storage format. The prototype for the UDM date_to_ut( ) is:

date_to_ut (fdate *date_out; fdate *date_in)

The parameter date_out is a date object (where fdate is the date UDT) for storing the date in the storage format and date_in is a date object for storing the date in the source format. The method converts a date stored in date_in in a source format to the storage or universal format using location and time information stored in date_in. The method stores the converted date in date_out.

For example, where the universal format is the same as the modern Gregorian calendar, to convert the date 01 Muharram 01 (i.e., the first day of the month of Muharram in the first year of the Islamic calendar, 1 A.H.), date_to_ut receives a date object as date_in including the date (e.g., stored as three integers 1, 1, 1 for day, month, year) and a location and time indicating the Islamic calendar. The date object date_out is a new date object with blank data members (or default values). date_to_ut retrieves a calendar indicator from the atlas table using the location and time stored in the date_in object. The calendar indicator indicates the Islamic calendar. date_to_ut converts the date in date_in (1,1,1) from the Islamic calendar system to a date in the universal format. In this case, the date converts to 16, 7, 622 (16 Jul. 622 A.D.) in the universal format. date_to_ut stores the converted date in the date object date_out.

Figure 7:
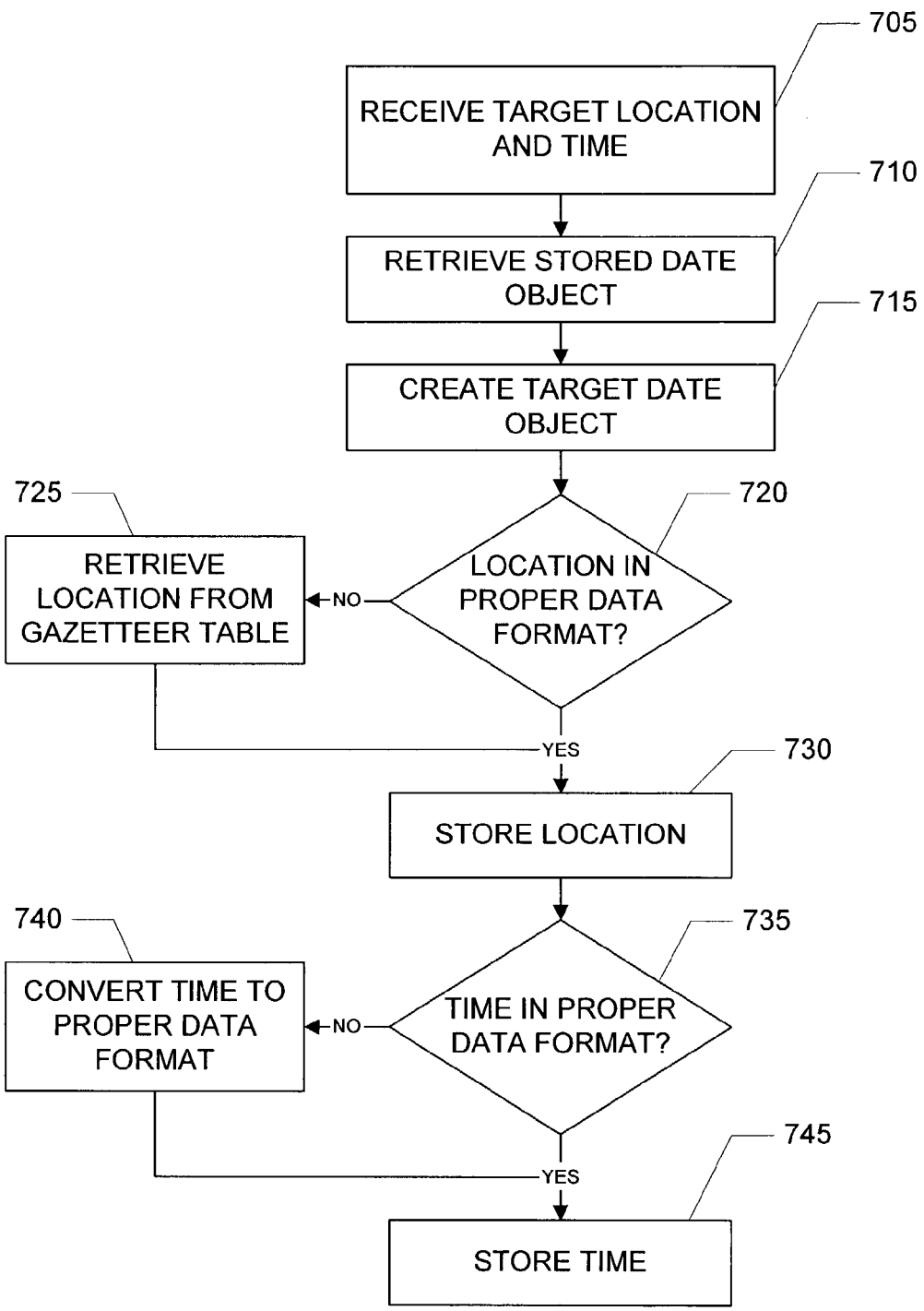
FIG. 7 is a flowchart of creating a new date object to store a date to be output in a target format converted from a date stored in the storage format.

FIG. 7 is a flowchart of creating a new date object to store a date to be output in a target format converted from a date stored in the storage format. DBMS 100 receives a request to output a stored date with a target location and time, block 705. DBMS 100 can receive various requests for stored dates, such as in input data from a user at client system 135 or in a query submitted to DBMS 100 where a returned entry includes the stored date. The location and time indicate a geographic location and time period to indicate the calendar system of the target date format. If DBMS 100 does not receive a location or time, DBMS 100 uses default values, such as the current location and time where DBMS 100 is situated. In another implementation, if DBMS 100 does not receive a location or time, DBMS 100 sets the calendar indicator to a default calendar system (in this case, DBMS 100 does not retrieve a calendar indicator from the atlas table). In an alternative implementation, DBMS 100 queries the source of the input date (e.g., the user) for missing location and time information. DBMS 100 retrieves the storage date object storing the date indicated in the request, block 710. DBMS 100 creates a new target date object to store the date after the date is converted, block 715. DBMS 100 uses a data constructor method, such as to create a date object 405 as described above referring to FIG. 4.

Before converting the stored date, DBMS 100 verifies the data format of the received target location and time data. DBMS 100 checks the received data to determine whether the location is in an appropriate data format, block 720. The proper data format for a location matches the data format of the location data member of the date object, such as a polygon object or coordinates stored as integers, as described above referring to location member 420 of date object 405 in FIG. 4. When DBMS 100 receives a location as a place name, such as in a string, DBMS 100 uses the place name as a key to retrieve a location from the gazetteer table, such as gazetteer table 300 described above referring to FIG. 3, block 725. When DBMS 100 receives a location in another data format, DBMS 100 uses a conversion method to convert the location into a compatible data format, such as coordinates or a place name string (which is replaced in turn by a location retrieved from the gazetteer table). DBMS 100 stores the location in the proper data format in the location data member of the target date object, block 730.

DBMS 100 checks the received data to determine whether the time is in an appropriate data format, block 735. The proper data format for a time matches the data format of the time data member of the date object to store the date, such as an integer, as described above referring to time member 425 of date object 405 in FIG. 4. When DBMS 100 receives a time in another data format, such as a string, DBMS 100 uses a conversion method to convert the time into a compatible data format, such as by using the date parser method described below, block 740. DBMS 100 stores the time in the proper data format in the time data member of the target date object, block 745. In an alternative implementation, DBMS 100 prompts the user to re-enter any data that is not in a proper format before creating a new target date object.

Figure 8:
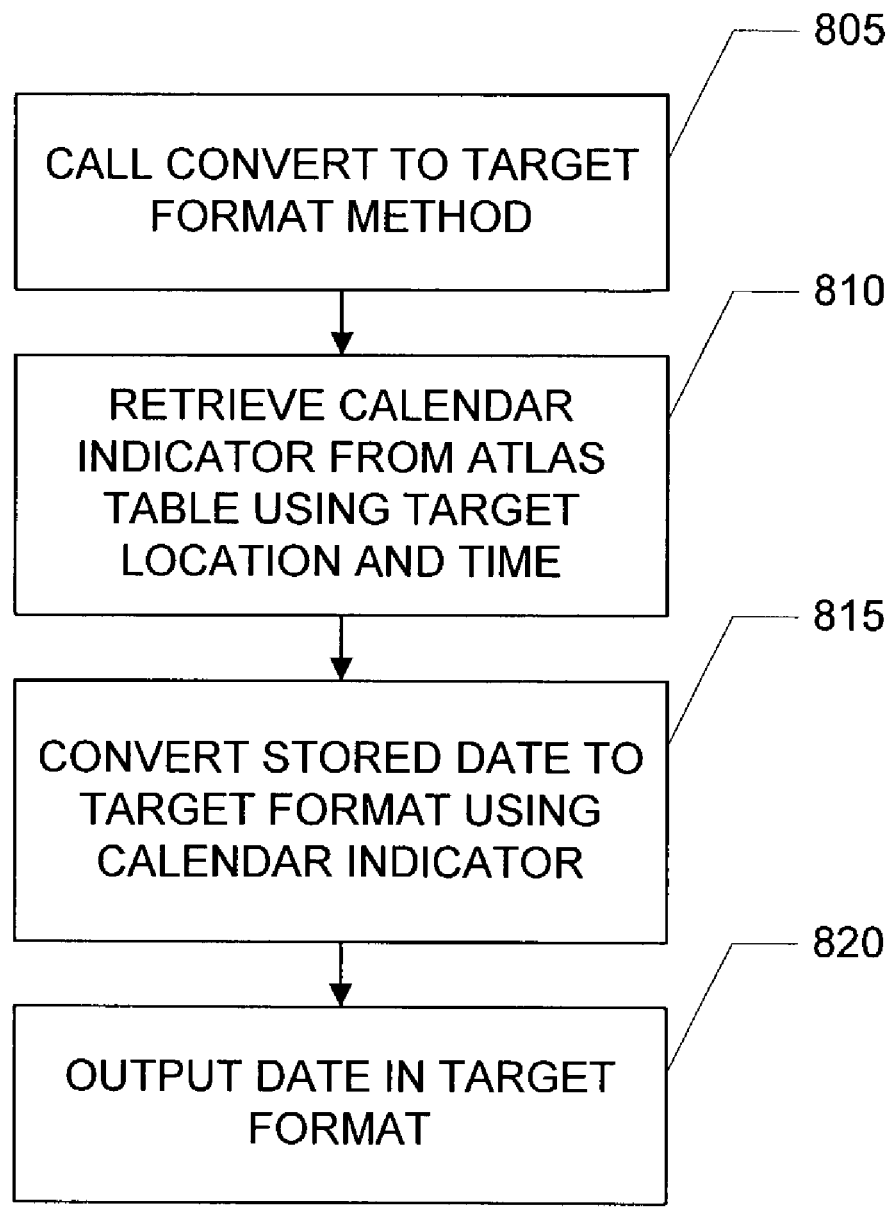
FIG. 8 is a flowchart of converting a date from the storage format to a target format.

FIG. 8 is a flowchart of converting a date from the storage format to a target format. After retrieving a storage date object and preparing a new target date object as described above referring to FIG. 7, DBMS 100 calls a conversion method for converting the date stored in the storage date object to a target format, block 805. DBMS 100 passes the storage and target date objects (or references to the objects) as parameters to the method call. DBMS 100 retrieves a calendar indicator from the atlas table using the target location and time stored in the target date object, block 810. DBMS 100 uses the location and time as keys to select the entry matching the location and time (e.g., as selection criteria in a query to the atlas table). As discussed above, in one implementation, the atlas table stores polygon objects indicating regions and DBMS 100 selects one or more entries having polygons including coordinates provided as the location in the target data object. If the location and time match more than one entry having different calendar indicators, DBMS 100 selects one entry, such as by comparing the date stored in the storage date object with the date formats indicated by the calendar indicators, matching default localization settings, or querying the user. DBMS 100 retrieves the calendar indicator stored in the selected entry, such as the data stored in the calendar field of an entry as described above referring to atlas table 200 in FIG. 2. DBMS 100 stores the retrieved calendar indicator in the calendar data member of the target date object. In one implementation, DBMS 100 retrieves more than one entry from the atlas table and selects one entry by comparing the date to the date formats indicated by the calendar indicators of the returned entries.

DBMS 100 uses the calendar indicator to convert the date from the storage format to the target format, block 815. The retrieved calendar indicator indicates the target date format for the date to be output in the target date object. The conversion method selects a conversion process according to the calendar indicator. In one implementation, DBMS 100 calls another conversion method, specific to the format indicated by the calendar indicator. DBMS 100 stores the converted date in the target format in the target date object. DBMS 100 also stores data in the target date object indicating that the date is stored in the target format, such as by storing the retrieved calendar indicator in the calendar data member of the target date object. DBMS 100 outputs the target date object, block 820. In another implementation, DBMS 100 returns the storage object to the process or method that called the conversion method.

In one example, DBMS 100 uses a universal format as the storage format and a UDM (user defined method) called ut_to_date as the conversion method for converting from the storage format to a target format. The prototype for the UDM ut_to_date( ) is:

ut_to_date (fdate *date_out; fdate *date_in)

The parameter date_out is a date object (where fdate is the date UDT) for storing the date in the target format and date_in is a date object for storing the date in the storage format. The method converts a date stored in date_in in the storage or universal format to the target format using location and time information stored in date_out. The method stores the converted date in date_out.

For example, where the universal format is the same as the modern Gregorian calendar, to convert the date 16 Jul. 622 (i.e., the $16^{th}$ day of the month of July in the $622^{nd}$ year of the Gregorian calendar, 622 A.D.), date_to_ut receives a date object as date_in including the date (e.g., stored as three integers 16, 7, 622 for day, month, year) and a new date object as date_out including a target location and time indicating the Islamic calendar. In preparing to call ut_to_date, DBMS 100 retrieves a date object to pass as date_in and creates a new date object to pass as date_out. DBMS 100 stores the target location and time in the new date object's location and time data members. date_to_ut retrieves a calendar indicator from the atlas table using the location and time stored in the date_out object. The calendar indicator indicates the Islamic calendar. date_to_ut converts the date in date_in (16,7,622) from the universal format to a date in the Islamic calendar system. In this case, the date converts to 1, 1, 1 (01 Muharram 01 A.H.) in the Islamic calendar system. date_to_ut stores the converted date in the date object date_out.

DBMS 100 provides additional methods to support the date UDT and provide operations on date objects. DBMS 100 provides typical object support methods, such as constructors and destructors and methods for extracting data stored in the date object's data members (e.g., getcalendar( ) to retrieve the calendar indicator stored in a date object's calendar data member).

DBMS 100 also provides one or more methods to set and access localization settings. The localization methods define the default calendar system and default date format for an unspecified source or target format (e.g., when no location and time are provided for converting a date). In one implementation, DBMS 100 defines multiple default calendar systems and organizes the default systems such as by using a priority or conditional system.

Figure 9:
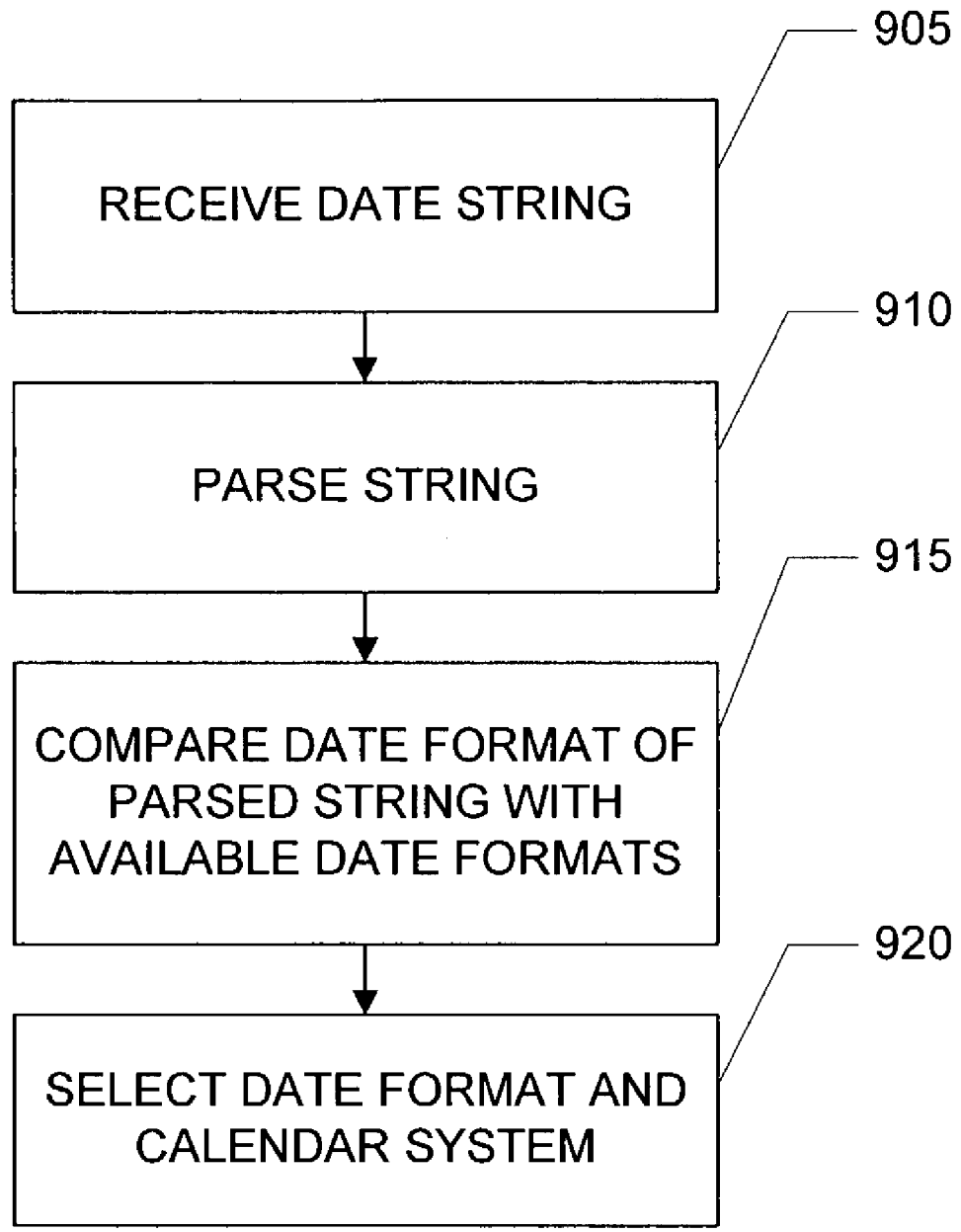
FIG. 9 is a flowchart of a date parser method extracting a date from a string.

DBMS 100 uses a date parser method to convert a date provided as a string to a date format to store in a date object. FIG. 9 is a flowchart of a date parser method extracting a date from a string. DBMS 100 passes a string to the date parser method, block 905. The string is a character string, such as an ASCII string or a varchar object. In one implementation, DBMS 100 calls the date parser method with the string as one parameter and a new date object as another parameter. The date parser method parses the string to extract the date from the string, block 910. The date parser method compares the extracted information to date formats available to DBMS 100 and the date UDT to select a proper date format to recognize the information in the string as a date, block 915. In one implementation, the date parser method uses the localization settings and default calendar system to resolve ambiguities. The date parser method selects a date format and stores the date in a date object, block 920. When the date parser method has received a date object as a parameter, the date parser method stores the date and a calendar indicator indicating the selected calendar in the received date object.

DBMS 100 also provides a holiday method to determine whether a date is a holiday. DBMS 100 includes a holiday table indicating which days in which calendar systems are what holidays. FIG. 10 is a representation of a holiday table 1000. Holiday table 1000 includes three fields: a calendar field 1005, a date field 1010, and a holiday name field 1015. Calendar field 1005 stores a calendar indicator. Date field 1010 stores a date, including a day and a month. The day and the month in date field 1010 represent numerically the month and day of the month in the calendar system indicated by the corresponding calendar field 1010. For example, the 01/01 for the Gregorian calendar indicates the $1^{st}$ day of the month of January, while 01/01 for the Islamic calendar indicates the $1^{st}$ day of the month of Muharram. Holiday name field 1015 stores a name of a holiday as a string. The holiday name stored in an entry is the name of the holiday occurring on the date in the calendar system indicated by date field 1010 and calendar field 1005 for the entry. In another implementation, the holiday table also includes a location or country field to accommodate holidays specific to regions or countries that use the same calendar.

Accordingly, DBMS 100 uses a calendar indicator and a date to select one or more entries in holiday table 1000 and retrieve the holiday name stored in each selected entry. The holiday method receives a date object as a parameter and returns the name of the holiday(s), if any, corresponding to the date stored in the date object. The date object parameter indicates a date (using the day and month of the date data member) and a calendar system in the date and calendar data members (recall date member 410 and calendar member 415 described above referring to FIG. 4). If the date object does not indicate a calendar system, the holiday method uses the location and time information stored in the location and time data members (recall location member 420 and time member 425 of FIG. 4) to retrieve a calendar indicator from the atlas table (recall block 610 described above referring to FIG. 6). If the date object does not indicate location and time as well, the holiday method uses the default calendar system as set in the localization settings.

Holiday table 1000 stores entries for holidays that always fall upon the same date, or "fixed" holidays. However, some calendar systems also include holidays that do not fall upon fixed days, or "relative" holidays (e.g., Easter in the Gregorian calendar falls on the first Sunday after the paschal full moon, rather than on the same date each year). The holiday method includes (or accesses additional methods that include) processes for calculating relative holidays for each supported calendar system. The holiday method determines the calendar system as described above and compares the date in the received date object to each of the appropriate relative holidays for the selected calendar system, such as the relative holidays that occur within the year of the date (using the year of the date data member). In an alternative implementation, the holiday table also includes entries for relative holidays (or DBMS 100 includes an additional relative holiday table) and the holiday method checks for relative holidays in the same way as for fixed holidays. In this case, DBMS 100 periodically updates the relative holiday dates in the holiday table, such as to reflect the relative holidays for the current year. When checking for a year that does not have updated relative holidays in the holiday table, the holiday method generates the relative holidays as described above.

In an alternative implementation, the holiday table stores dates for fixed holidays in the storage format and converts a date from a date object to the storage format to determine if that date is a holiday. In this case, the holiday table is updated periodically to reflect fixed holidays shifting for calendar systems that use a calendar of a different length than that of the storage format. Alternatively, dates of fixed holidays are generated as needed according to the indicated date and calendar system, similar to relative holidays.

DBMS 100 provides additional methods for operations on date objects. DBMS 100 performs the operations on dates in the storage format. For a date that is not already in the storage format, DBMS 100 uses a conversion method (e.g., date_to_ut, as described above) to convert a date to the storage format, performs the operation, and then uses another conversion method (e.g., ut_to_date, as described above) to convert the resulting date back to the original format.

DBMS 100 provides comparison operators for comparing dates and providing a Boolean value (e.g., TRUE or FALSE) according to the result of the comparison. Comparison operators include equals (=), not equals (!=), greater than (>), less than (<), greater than or equal to (>=), and less than or equal to (<=). Dates need not be in the same date format. As described above, DBMS 100 converts the two dates to the storage format to perform the comparison on a common basis.

Examples of additional methods providing date operations include:
  Interval Determination: given two date objects, the method determines the interval between the dates stored in the date objects in days, weeks, months, or years, or combinations thereof. The method converts both dates to the storage format for comparison so the dates need not be in the same date format or be from the same calendar system.
  Add/Subtract Interval: given a date object and an interval of time, the method determines the date obtained by adding or subtracting the interval to or from the date in the date object.
  Next/Previous: given a date object and a time unit, the method determines the next or previous day, week, month, year, or other specified time unit relative to the date in date object.
  Leap Year: given a date object, the method determines whether the date in the date object occurs in a leap year.
  Extra Lunar Month: given a date object, the method determines whether the date in the date object occurs during a year with an extra lunar month, according to the calendar system indicated by the date object.
  Day of the Week: given a date object, the method determines which day of the week the date in the date object falls, according to the calendar system indicated by the date object, or the default calendar system if no calendar system is indicated. In an alternative implementation of this method (or in an additional method), the method returns the number of the day of the week of the date in the date object according to the calendar system and location indicated by the date object (e.g., where Sunday is 0 in the United States, but Monday is 0 in parts of Europe).
  New Year: given a date object or a calendar indicator, the method determines the date of the New Year in the calendar system indicated by the date object or the calendar indicator.

The various implementations of the invention are realized in electronic hardware, computer software, or combinations of these technologies. Most implementations include one or more computer programs executed by a programmable computer. For example, referring to FIG. 1, in one implementation, DBMS 100 includes one or more programmable computers implementing processing modules 105$_{1 \ldots N}$, data storage facilities 110$_{1 \ldots N}$, and parsing engine 120. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations based on a DBMS using a massively parallel processing (MPP) architecture, other types of database systems, including those that use a symmetric multiprocessing (SMP) architecture, are also useful in carrying out the invention. Accordingly, the present invention is not limited to only those implementations described above.

What is claimed is:

1. A computer-implemented method for use by a database to convert date information using spatial information, the method comprising:
  storing, by a processing device, in the database date information in a storage format corresponding to a first calendar system;
  receiving, by the processing device, target spatial information; querying, by the processing device, the database to retrieve a target format indicator matching both the received target spatial information and the date information stored in the storage format, wherein the retrieved target format indicator indicates a target format based on a target calendar system, the target format comprises a calendar system that differs from the first calendar system of the storage format, and includes using the spatial information and the date information as keys to an atlas database table to retrieve the target format indicator, where the atlas database table includes a plurality of atlas entries and each atlas entry includes a calendar format field for storing a format indicator; and
  converting, by the processing device, the date information from the storage format to the target format.

2. The method of claim 1, where the date information indicates a date including a day, a month, and a year.

3. The method of claim 1, where the storage format is a universal date format.

4. The method of claim 1, further comprising outputting the date information in the target format to a client system.

5. The method of claim 1, where converting the date information includes calling a method for a date object.

6. The method of claim 1, where converting the date information from the storage format to the target format includes preserving the date information in the storage format.

7. The method of claim 1, further comprising:
  receiving the date information in a source format based on a source calendar system;
  receiving source spatial information;
  retrieving from the database a source format indicator matching the received source spatial information, where the retrieved source format indicator indicates a source format based on a source calendar system; and converting the date information from the source format to the storage format.

8. The method of claim 1, where each atlas entry also includes a location field for storing one or more polygons, where a polygon indicates a geographic region.

9. The method of claim 1, where the target spatial information is a target set of coordinates indicating a location on the earth.

10. The method of claim 1, where the target spatial information is a target region.

11. The method of claim 1, where querying the database to retrieve the target format indicator includes:
   using the spatial information as a key to a gazetteer database table to retrieve a location indicator, where the gazetteer database table includes a plurality of gazetteer entries and each gazetteer entry includes a location field for storing a location indicator; and
   using the location indicator as a key to an atlas database table to retrieve the target format indicator, where the atlas database table includes a plurality of atlas entries and each atlas entry includes a calendar format field for storing a format indicator.

12. The method of claim 11, where the target spatial information is a target place name.

13. The method of claim 11, where the location indicator is a target set of coordinates indicating a location on the earth.

14. The method of claim 11, where the location indicator is a target region.

15. The method of claim 1, further comprising receiving target time information indicating a time corresponding to the target spatial information, and where the database is queried to retrieve the target format indicator matching the received target spatial information and the received target time information.

16. The method of claim 15, where the target time information indicates a date in the past.

17. The method of claim 15, where querying the database to retrieve the target format indicator includes using the spatial information and the target time information as keys to an atlas database table to retrieve the target format indicator, where the atlas database table includes a plurality of atlas entries and each atlas entry includes a calendar format field for storing a format indicator.

18. The method of claim 15, where querying the database to retrieve the target format indicator includes:
   using the spatial information as a key to a gazetteer database table to retrieve a location indicator, where the gazetteer database table includes a plurality of gazetteer entries and each gazetteer entry includes a location field for storing a location indicator; and
   using the location indicator and the target time information as keys to an atlas database table to retrieve the target format indicator, where the atlas database table includes a plurality of atlas entries and each atlas entry includes a calendar format field for storing a format indicator.

19. The method of claim 18, where the target spatial information is a target place name.

20. The method of claim 18, where the location indicator is a target set of coordinates indicating a location on the earth.

21. The method of claim 18, where the location indicator is a target region.

22. The method of claim 1 where a user defined data type is used to store the date information in the storage format.

23. A computer-implemented method for use by a database to convert date information using spatial information, the method comprising:
   receiving, by a processing device, date information in a source format based on a source calendar system;
   receiving, by the processing device, a time period indicating the calendar system of the date information;
   receiving, by the processing device, source spatial information;
   retrieving, by the processing device, from the database a source format indicator matching both the received source spatial information and the received time period where the retrieved source format indicator indicates the source format based on the source calendar system;
   converting, by the processing device, the date information from the source format to a storage format using the source format indicator, wherein the storage format comprises a calendar system that differs from the source calendar system, and uses the spatial information and the time period as keys to an atlas database table to retrieve the storage format, where the atlas database table includes a plurality of atlas entries and each atlas entry includes a calendar format field for storing a format indicator; and
   storing, by the processing device, the date information in the storage format in the database.

24. A computer-readable medium having computer-executable instructions tangibly embodied thereon for execution by a processing device, the computer-executable instructions for converting date information using spatial information in a database, that when executed cause the processing device to:
   retrieve date information stored in a first format corresponding to a first calendar system;
   receive target spatial information;
   retrieve from the database a target format indicator matching both the received target spatial information and the date information stored in the first format where the retrieved target format indicator indicates a target format based on a target calendar system that differs from the first calendar system using the spatial information and the date information as keys to an atlas database table to retrieve the target format indicator, where the atlas database table includes a plurality of atlas entries and each atlas entry includes a calendar format field for storing a format indicator; and
   convert the date information from the first format to the target format.

25. A database system implemented in a massively parallel processing device, comprising:
   one or more data storage facilities that store data composing records in tables of a database, including one or more fields storing dates in a storage format corresponding to a first calendar system and an atlas table storing one or more calendar indicators;
   one or more processing modules that manage the data stored in the data-storage facilities; and
   a database management component that:
      receives spatial information;
      retrieves a calendar indicator from the atlas table using both the spatial information and a date stored in the storage format; and
      uses the retrieved calendar indicator to convert the date from the storage format to a target format matching the retrieved calendar indicator, wherein the target format corresponds to a second calendar system that differs from the first calendar system, and wherein the spatial information and the date are used as keys to the atlas table to retrieve the target format, where the atlas table includes a plurality of atlas entries and each atlas entry includes a calendar format field for storing a format indicator.

26. The database system of claim 25, where the spatial information is a target set of coordinates indicating a location on the earth.

27. The database system of claim 25, where the atlas table also stores one or more polygons for each calendar indicator, where each polygon indicates a geographic region.

28. The database system of claim 25, where the spatial information is a target region.

29. The database system of claim 25, where the data storage facilities also include a gazetteer table storing one or more location indicators, and where the database management component is further configured to retrieve a location indicator from the gazetteer table using spatial information and retrieve a calendar indicator from the atlas table using a retrieved location indicator.

30. The database system of claim 25, where the data storage facilities also include a holiday table storing holiday names, and where the database management component is further configured to retrieve a holiday name from the holiday table using a date and a calendar indicator.

31. The database system of claim 25, where the database management component is further configured to generate a relative holiday date using a calendar indicator, and compare a date to the generated relative holiday date.

32. The database system of claim 25, where the database management component is further configured to parse a string to derive a date from the string.

33. The database system of claim 25, where the database management component is further configured to determine an interval between two dates where each date is in a different date format.

34. The database system of claim 25, where the database management component is further configured to modify a date by an interval.

35. The database system of claim 25, where the database management component is further configured to determine a neighboring time unit to a date.

36. The database system of claim 25, where the database management component is further configured to determine whether a date occurs in a leap year.

37. The database system of claim 25, where the database management component is further configured to determine whether a date occurs in an extra lunar month.

38. The database system of claim 25, where the database management component is further configured to determine on which day of the week a date falls.

39. The database system of claim 25, where the database management component is further configured to determine the date of the beginning of a new year for a calendar system indicated by a calendar indicator.

* * * * *